Feb. 4, 1958  G. S. FORTNEY  2,822,441
PROTECTOR COVER
Filed Feb. 23, 1956
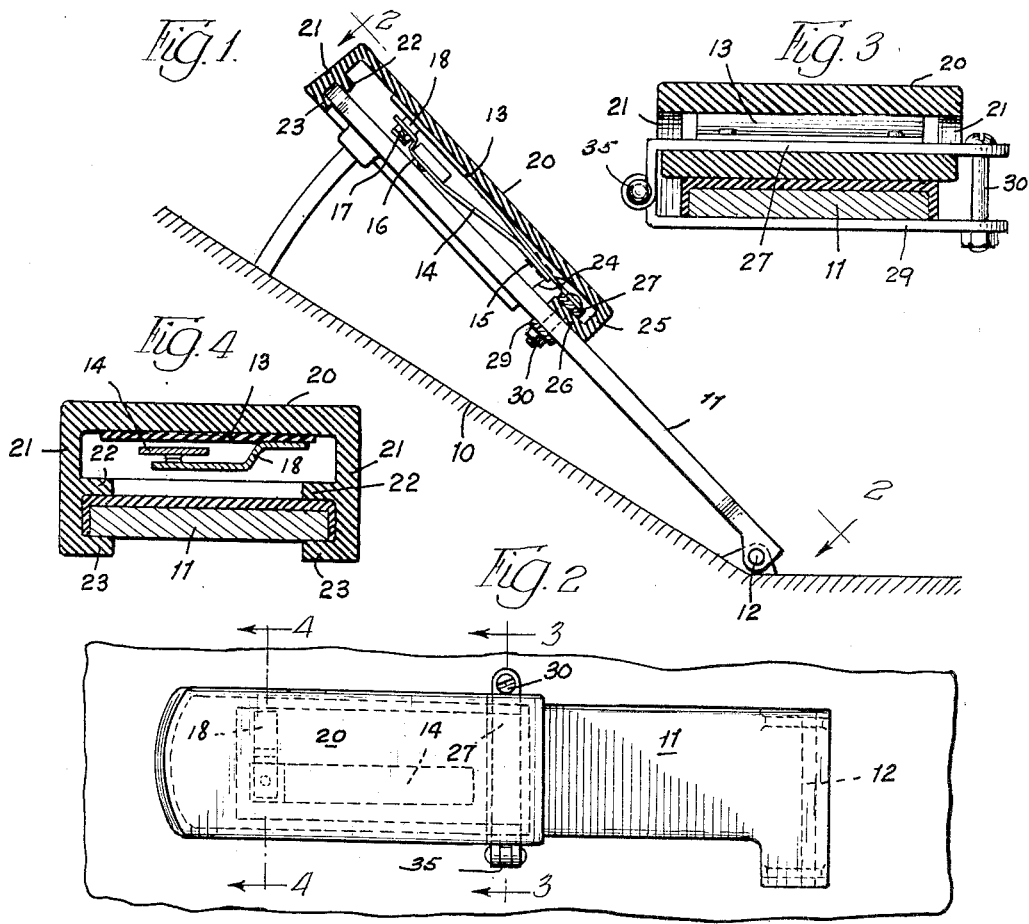
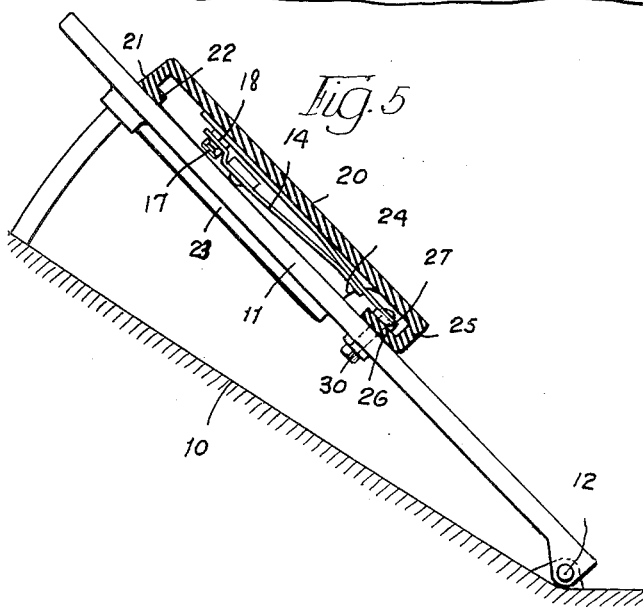
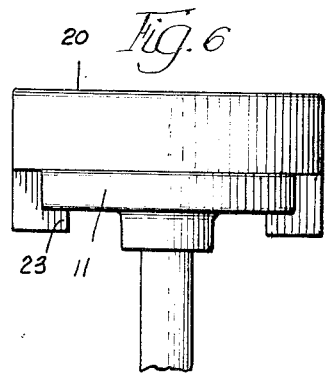
INVENTOR.
Grant S. Fortney,
BY

United States Patent Office 2,822,441
Patented Feb. 4, 1958

2,822,441

PROTECTOR COVER

Grant S. Fortney, Chicago, Ill.

Application February 23, 1956, Serial No. 567,238

7 Claims. (Cl. 200—86.5)

This invention relates to improvements in protectors for electric switches to protect same from the elements, and abuse due to rough usage to which certain of said switches are subjected.

More particularly the invention provides an auxiliary wear surface for an accelerator pedal of an automobile or other vehicle. In some of these vehicles, a stop light switch is associated with the accelerator pedal in such manner that when foot pressure on the pedal is released, it allows the points of the switch to contact and illuminate a stop light, but when pressure is applied to the accelerator, contact of the switch points is broken. Even ordinary service is rather rough; dirt, etc., hinders proper functioning of the switch points, and thus it becomes desirable to provide protection for the switch and at the same time an auxiliary wear surface for the pedal.

Another object of the invention is to provide a protector of resilient material so that it may be stretched over accelerator pedals of different widths.

It is a further object of the invention to provide a protector having one open end so that it may be slipped over the accelerator pedal into position thereon.

Some accelerator pedals are longer than others, but in every instance the switches are applied to the pedals, so that they will occur substantially under the normal operating position of the ball of the foot of the operator. Thus in these instances of long pedals, it is necessary to cut away the toe portion of the lower part of the protecting cover so that the end of the pedal may project therethrough and still the upper part of the cover will protect the switch. Consequently, it is a further object of the invention to provide a protector which may accommodate accelerators of varying length.

Other objects and advantages of the invention will appear in the following description thereof.

Referring now to the accompanying drawing forming part of this application, and wherein like reference characters indicate like parts.

Figure 1 is a longitudinal sectional view through an accelerator pedal with the switch and the improved cover applied thereto.

Figure 2 is a top plan view of the invention.

Figure 3 is a cross-sectional view on the line 3—3 of Figure 2.

Figure 4 is a cross-sectional view on the line 4—4 of Figure 2.

Figure 5 is a view similar to Figure 1 of a modified form of the invention.

Figure 6 is an end view of Figure 5.

In the drawings 10 indicates the inclined portion of the floor of the driver's compartment of an automotive vehicle, and 11 indicates the ordinary foot accelerator pedal which is pivoted at 12 to the floor of the vehicle as is common.

In some vehicles these accelerator pedals are equipped with switches in a manner so that when pressure on the pedal by an operator's foot is released, spring contacts engage and close a circuit to illuminate the stop light, thereby warning an oncoming vehicle driver even before the brake pedal is depressed, which also closes a circuit to the stop light. Such a switch comprises a base member 13 to which an elongated switch arm 14 is attached at one end as at 15. The contact end of this arm is offset a short distance as at 16 so as to extend over the cooperating contact 17 of the other switch arm 18. Arm 14 is biased so that the contacts of the two arms will remain closed unless forcibly separated.

A protecting cover for this switch is provided of molded resilient material and comprises a flat tread portion 20, having marginal depending flanges 21, overlapping the toe and sides of the switch and accelerator pedal, and which flanges are in turn provided with intermediate 22 and bottom 23 inwardly extending flanges, which flanges 21, 22 and 23 occur on opposite sides and across the upper end of said cover. Said flanges 21, 22 and 23 terminate short of the lower end of the cover, being cut-away as indicated at 24. The tread portion 20 extends beyond the end of said flanges, is turned downwardly as at 25 and then inwardly as at 26. When tread portion 20 is depressed, it will in turn depress base member 13, which will cause arm 14 to engage accelerator pedal 11 and thus be raised, breaking contact between arms 14 and 17.

The rear end of the base member 13 is provided with a transversely extending reinforcing and attaching bar 27, having a hole 28 through one end thereof, which bar 27 and rear end of the member 13 occur between the inturned portion 26 and tread portion 20. The other end of the bar 27 is turned downwardly and curled into circular form to provide one part of hinge 35. Another bar 29, similar to bar 27 extends under the accelerator pedal, one end of which forms the other part of hinge 35, and the other end is provided with a hole which registers with the hole 28, and through which registering holes a bolt 30 may extend to thereby secure the cover in proper position over the switch to protect the same from an accumulation of dirt, etc., sufficient to effect the proper functioning of the switch points. It is obvious of course that the hinge 35 may be dispensed with, and simply two bolts 30 hold the ends of the bars in clamped position.

This cover also provides an auxiliary wear surface for the accelerator pedal which can easily be replaced from time to time as circumstances require.

A modified form of the invention is shown in Figures 5 and 6, wherein the toe end of the cover is cut away below the transverse flange 22 as clearly indicated in Figure 5.

This provision is so that the cover may accommodate accelerator pedals of varying length. The switch is always secured to the pedal, regardless of its length, so that it will occur substantially where the ball of the operator's foot rests on the pedal. In the case of a long pedal the end thereof would extend beyond the toe end of the cover, and therefore the cover is cut away so that the end of the pedal may protrude therethrough as indicated in Figure 5.

I claim:

1. The combination with an accelerator pedal having a stop light switch therefor operable by an operator's foot in actuating the pedal, of a cover for said pedal and switch, said cover comprising a tread portion applicable to said pedal, an end and side walls overlapping corresponding edges of said pedal and switch, and clamp means for removably attaching said switch and said cover to said pedal, whereby the switch is protected from abuse during operation of the pedal by an operator's foot.

2. The combination with an accelerator pedal having a stop light switch therefor operable by an operator's foot in actuating the pedal, of a cover for said pedal and switch, said cover comprising a tread portion applicable to said pedal, an end and side walls overlapping corresponding edges of said pedal and switch, and means for removably attaching said cover to said pedal, said end and side walls having inwardly extending bottom and intermediate flanges located on opposite sides of said accelerator pedal.

3. The combination with an accelerator pedal having a stop light switch therefor operable by an operator's foot in actuating the pedal, of a cover for said pedal and switch, said cover comprising a tread portion applicable to said pedal, and end and side walls overlapping corresponding edges of said pedal and switch, and means for removably attaching said cover to said pedal, said end wall being partially cut away to permit an accelerator pedal to extend therethrough.

4. The combination with an accelerator pedal having a stop light switch attached thereto operable by an operator's foot in actuating the pedal, of a cover for said pedal and switch, said cover comprising a tread portion applicable to said pedal, and end and side walls overlapping corresponding edges of said pedal and switch, and means for removably attaching said cover to said pedal, said end and side walls having inwardly extending bottom and intermediate flanges located on opposite sides of said accelerator pedal, said end wall being cut away below said intermediate flange to permit an accelerator pedal to extend therethrough.

5. The structure according to claim 3, in which said means comprises a clamp removably encircling said pedal and the rear ends of said cover and switch.

6. The combination with an accelerator pedal having a stop light switch therefor operable by an operator's foot in actuating the pedal, of a cover for said pedal and switch, said cover comprising a tread portion and an end and side walls overlapping the toe and side edges of said pedal and switch, and clamp means removably securing said cover and switch to said accelerator pedal.

7. The structure according to claim 6, wherein said end and side walls are provided with inwardly extending flanges underlapping and overlapping the sides and toe of said accelerator pedal.

References Cited in the file of this patent
UNITED STATES PATENTS

| | | |
|---|---|---|
| 2,674,669 | Leedam | Apr. 6, 1954 |
| 2,707,214 | Kaleba et al. | Apr. 26, 1955 |